(12) United States Patent
Kim et al.

(10) Patent No.: US 9,417,371 B2
(45) Date of Patent: Aug. 16, 2016

(54) METHOD FOR MANUFACTURING REFLECTIVE POLARIZER

(71) Applicant: Samsung Display Co. Ltd., Yongin (KR)

(72) Inventors: Chang Ok Kim, Yongin-si (KR); Sung Hoon Yang, Seoul (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/794,004

(22) Filed: Jul. 8, 2015

(65) Prior Publication Data

US 2016/0070044 A1    Mar. 10, 2016

(30) Foreign Application Priority Data

Sep. 4, 2014    (KR) .................. 10-2014-0117617

(51) Int. Cl.
*G02B 5/30* (2006.01)
*G02B 1/08* (2006.01)

(52) U.S. Cl.
CPC ............. *G02B 5/3058* (2013.01); *G02B 1/08* (2013.01)

(58) Field of Classification Search
CPC . H01L 2924/0132; G02B 1/08; G02B 5/3058
USPC ........................................................ 216/24
See application file for complete search history.

(56) References Cited

U.S. PATENT DOCUMENTS

| 6,977,702 | B2 | 12/2005 | Wu |
| 2008/0192346 | A1 | 8/2008 | Kim et al. |
| 2010/0079706 | A1 | 4/2010 | Kim et al. |

FOREIGN PATENT DOCUMENTS

| KR | 10-2009-0001371 A | 1/2009 |
| KR | 10-1005005 B1 | 12/2010 |
| KR | 10-2013-0039076 A | 4/2013 |
| KR | 10-1333057 B1 | 11/2013 |

*Primary Examiner* — Roberts Culbert
(74) *Attorney, Agent, or Firm* — Robert E. Bushnell, Esq.

(57) ABSTRACT

A manufacturing method of a reflective polarizer includes forming a metal layer on a first substrate; forming a mask layer divided into an opening area and a non-opening area on the metal layer, and having grooves patterned in the opening area, the groove exposing the metal layer; increasing hydrophobicity of a surface by treating the mask layer using a silane coupling agent; inducing phase separation of a hydrophilic component and a hydrophobic component of a block copolymer after filling the grooves of the mask layer with the block copolymer; selectively removing the hydrophilic component or the hydrophobic component block copolymer of the block copolymer; and etching the metal layer using the block copolymer as a mask.

18 Claims, 20 Drawing Sheets

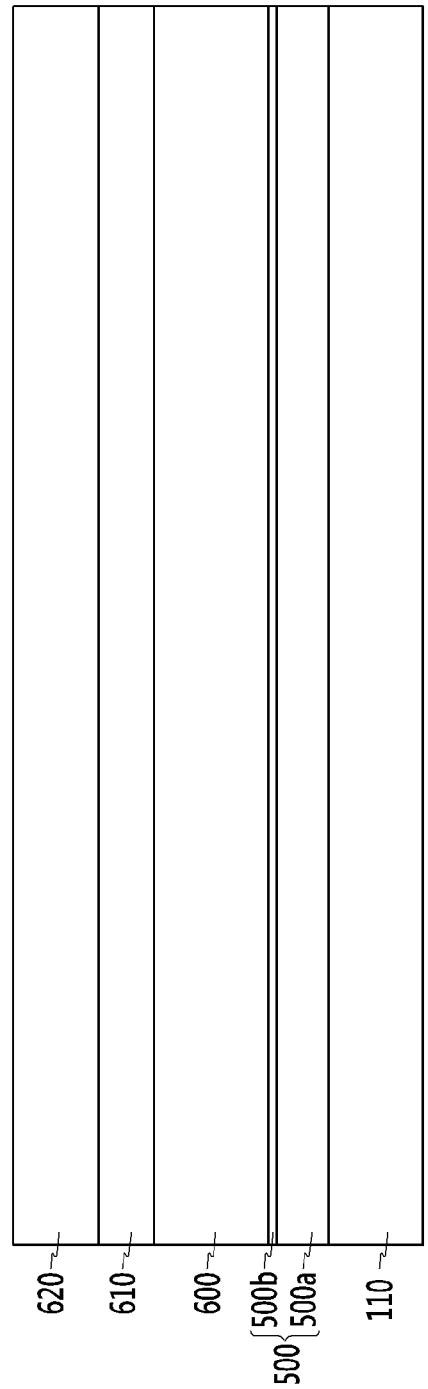

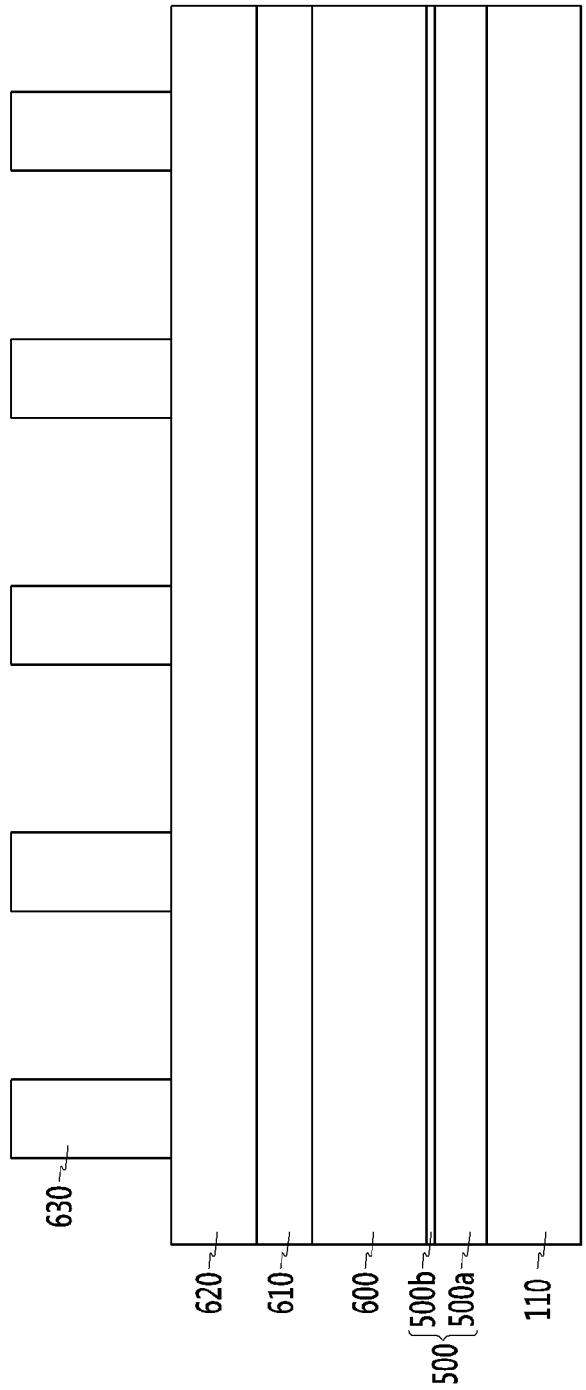

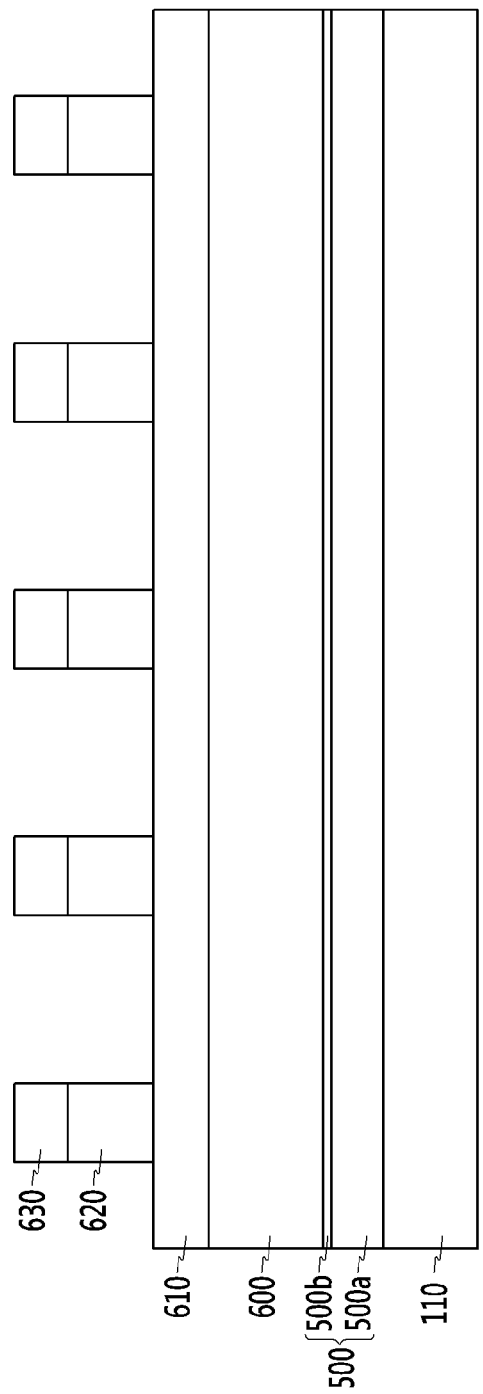

METHOD FOR MANUFACTURING REFLECTIVE POLARIZER

CLAIM OF PRIORITY

This application makes reference to, incorporates into this specification the entire contents of, and claims all benefits accruing under 35 U.S.C. §119 from an application for METHOD FOR MANUFACTURING REFLECTIVE POLARIZER earlier filed in the Korean Intellectual Property Office on Sep. 4, 2014 and there duly assigned Serial No. 10-2014-0117617.

BACKGROUND OF THE INVENTION

1. Field of the Invention

The present invention relates to a method for manufacturing a reflective polarizer.

2. Description of the Related Art

A liquid crystal display is one of flat panel displays which are currently most widely used, and includes two sheets of display panels in which field generating electrodes such as a pixel electrode and a common electrode are formed, and a liquid crystal layer interposed therebetween, and displays an image by applying a voltage to the field generating electrodes to generate an electric field in the liquid crystal layer, thereby determining an orientation of liquid crystal molecules of the liquid crystal layer based on the generated electric field and controlling polarization of incident light.

Depending upon the light source used, the liquid crystal displays are classified into a backlit liquid crystal display (backlit LCD) where images are displayed using a backlight unit placed at the back of a liquid crystal cell, a reflective liquid crystal display where the images are displayed using external natural light, and a transflective liquid crystal display (transflective LCD) where the structures of a backlit liquid crystal display and a reflective liquid crystal display are combined. The transflective liquid crystal display is operated in a room or a dark place with no external light source based on a transmission mode where the image display is made by using a built-in light source of the display device, and is operated in an outdoor high illumination environment based on a reflective mode where the image display is made by reflecting external light.

Of them, the backlit liquid crystal display and the transflective liquid crystal display that display images by using the backlight are commonly used because of their advantage that the display luminance is high.

However, the backlit LCD and the transflective LCD have problems in that some 50% of light made incident from the backlight is absorbed by a polarizer attached on a lower portion of the LCD and the remaining 50% or so of the light is used for image display, degrading the light efficiency and the display luminance.

The above information disclosed in this background section is only for enhancement of understanding of the background of the invention and therefore it may contain information that does not form prior art that is already known in this country to a person of ordinary skill in the art.

SUMMARY OF THE INVENTION

The present invention has been made in an effort to provide a method for manufacturing a reflective polarizer having excellent diffraction efficiency.

A manufacturing method of a reflective polarizer according to an exemplary embodiment of the present invention may include: forming a metal layer on a first substrate; forming a mask layer divided into an opening area and a non-opening area on the metal layer, and having grooves patterned in the opening area, the groove exposing the metal layer; increasing hydrophobicity of a surface by treating the mask layer using a silane coupling agent; inducing phase separation of a hydrophilic component and a hydrophobic component of a block copolymer after filling the grooves of the mask layer with the block copolymer; selectively removing the hydrophilic component or the hydrophobic component of the block copolymer; and etching the metal layer using the block copolymer as a mask.

The metal layer may be formed of a single layer made of aluminum or dual layers made of aluminum and titanium.

The mask layer may include a SiNx.

The forming the mask layer may include: forming a first SiNx layer on the metal layer; forming a mask metal layer on the first SiNx layer; forming a second SiNx layer on the mask metal layer; patterning the second SiNx layer to make grooves exposing the mask metal layer with constant gaps therebetween; forming SiOx partitions on the second SiNx layer; removing the second SiNx layer; and etching the metal layer and the first SiNx layer using the SiOx partitions as a mask.

The increasing of the hydrophobicity of the surface by treating the mask layer using the silane coupling agent may be performed by immersing the reflective polarizer in a solvent including the silane coupling agent after the forming of the mask layer.

The silane coupling agent may have an X-L-R structure, X may be a reaction functional group that is chemically combined with Si—H or N—H in the SiNx surface, R may be a hydrophobic functional group, and L may be a linker that links the reaction functional group and the hydrophobic functional group.

The X may be a methoxy or ethoxy material, or a halogen-based material.

The R may be a fluorine-containing compound or a compound including a benzene ring.

The R may be CF3- CF2n-, PDD (2,2-bis(trifluoromethyl)-4,5-difluoro-1,3-dioxole), or CBr3-.

The L may be carbon of $C_1$ or higher.

After the increasing of the hydrophobicity of the surface by treating the mask layer using the silane coupling agent, a contact angle of partitions of the mask layer may be greater than 50 degrees.

After the increasing of the hydrophobicity of the surface by treating the mask layer using the silane coupling agent, a contact angle of partitions of the mask layer may be greater by 30 degrees or more than a contact angle of the metal layer exposed between the partitions.

After the increasing of the hydrophobicity of the surface by treating the mask layer using the silane coupling agent, hydrogen in the SiNx surface may be removed by being reacted with X in the silane coupling agent.

The block copolymer may include a hydrophilic block and a hydrophobic block.

After filling the block copolymer in the grooves of the mask layer, phase separation of the block copolymer in the inducing the phase separation of a hydrophilic component and a hydrophobic component of the block copolymer may be performed using annealing.

In the inducing the phase separation of the hydrophilic component and the hydrophobic component of the block copolymer after filling the block copolymer in the grooves of the mask layer, the hydrophobic component may be formed adjacent to the partition of the SiNx grove and the hydrophilic component may be arranged in parallel with the hydrophobic component after the phase separation of the block copolymer.

After the selective removing of only the hydrophobic component or the hydrophilic component of the block copolymer, a gap between remaining the block copolymer may be less than 100 nm.

A line width of an opening of the completed reflective polarizer may be less than 100 nm.

As described above, in the manufacturing method of the reflective polarizer according to the exemplary embodiment of the present invention, partition patterns having a first gap may be formed with the SiNx layer and partition patterns having a narrower second gap may be formed using shape separation of a block copolymer between the partitions of the SiNx layer. The metal layer that becomes the reflective polarizer may be etched through the partition patterns such that the reflective polarizer has a narrow metal gap and an excellent polarization characteristic.

In addition, the SiNx layer may be treated with the silane coupling agent before forming the block copolymer to improve hydrophobicity so that uniform phase separation of the block copolymer may be occurred, and accordingly patterns may become more constant and uniform in the reflective polarizer.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein:

FIG. 3 to FIG. 19 are cross-sectional views sequentially illustrating a manufacturing method of a reflective polarizer according to an exemplary embodiment of the present invention.

DETAILED DESCRIPTION OF THE INVENTION

Figure 1:
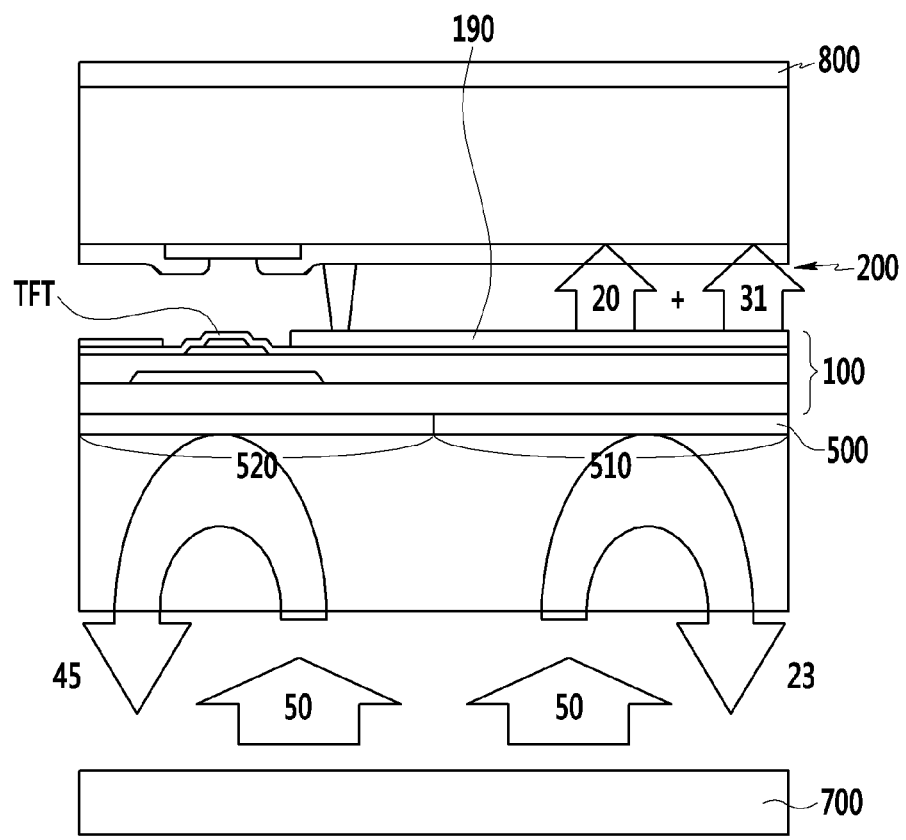
FIG. 1 is a cross-sectional view of a liquid crystal display including a reflective polarizer according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, a method for manufacturing a reflective polarizer according to an exemplary embodiment of the present invention will be described with reference to the accompanying drawings.

Figure 2:
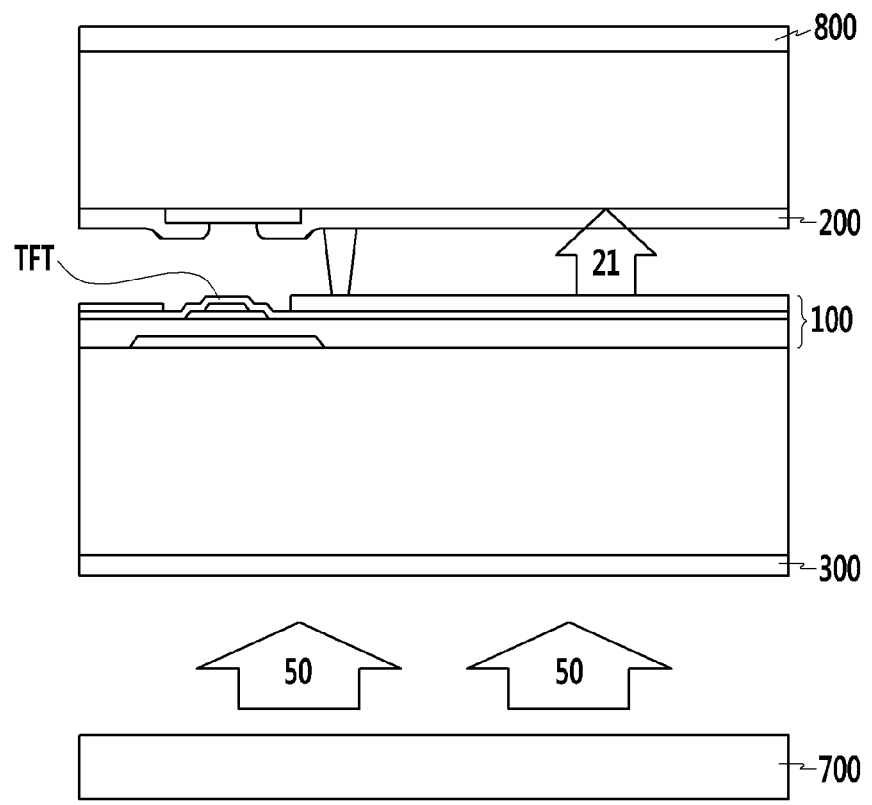
FIG. 2 shows a polarizer according to a comparative example of the present invention.

FIG. 1 is a cross-sectional view of a liquid crystal display employing a reflective polarizer of the present invention. FIG. 2 shows a polarizer according to a comparative example of the present invention.

Referring to FIG. 1, a reflective polarizer 500 according to an exemplary embodiment of the present invention is an in-cell polarizer that is directly disposed on a lower substrate 110. That is, the reflective polarizer 500 is directly provided on the lower substrate 100. The reflective polarizer 500 has a non-opening area 520 and an opening area 510.

On the other hand, a polarizer of FIG. 2 is an absorptive polarizer 300 provided separate from a lower substrate 100.

FIG. 1 and FIG. 2 respectively illustrate a movement path and efficiency of light from a light 700. Referring to FIG. 2, only 21% of the incident light is transmitted to an outside of the lower substrate 100 of a display device when using the typically separated absorptive polarizer 300.

However, referring to FIG. 1, light from the light 700 applied to the non-opening area 520 is reflected again, and such light is transmitted through the opening area 510 again so that total 51% of the applied light is transmitted to the outside of the lower substrate 100 of a display device as shown in FIG. 1.

Thus, when the reflective polarizer 500 is used, luminance can be improved and it is economical because high luminance can be realized with low power consumption.

Referring to FIG. 1, the reflective polarizer 500 divided into the non-opening area 520 and the opening area 510, and the non-opening area 520 corresponds to an area where a thin film transistor (TFT) and the like is formed and the opening area 510 corresponds to an area where a pixel electrode 190 and the like is formed.

The reflective polarizer 500 is formed of a material having a high reflection rate, such as a metal, and the non-opening area 520 has a planar shape and reflects light from the light 700 back to the light 700.

In addition, a plurality of metal lattices (not shown in FIG. 1) are formed in the opening area 510 of the reflective polarizer 500, and light is polarized through the metal lattices. In this case, as the metal lattices formed in the reflective polarizer 500 have narrow gaps and as the heights of the metal lattices are high, a polarization separation characteristic becomes excellent.

An appropriate gap between the metal lattices for excellent polarization characteristic is scores of nanometers.

Thus, in order to achieve the excellent polarization characteristic, the gap of the metal lattices in the opening area 510 of the reflective polarizer 500 needs to be formed with a unit of scores of nanometers. However, it is not easy to form metal lattices with a gap of scores of nanometers due to problems such as an alignment error and diffraction.

In an exemplary embodiment of the present invention, however, a reflective polarizer of which a gap of metal lattices is a unit of scores of nanometers is manufactured using a block copolymer and a silane coupling agent.

Hereinafter, a method for manufacturing a reflective polarizer according to an exemplary embodiment of the present invention will be described in detail.

FIG. 3 to FIG. 19 are cross-sectional views illustrating the manufacturing method of a reflective polarizer according to an exemplary embodiment of the present invention by steps.

The manufacturing method of the reflective polarizer according to the exemplary embodiment of the present invention includes: forming a metal layer on a first substrate; forming a mask layer divided into an opening area and a non-opening area on the metal layer and having a groove (or grooves) exposing the metal layer patterned in the opening area; increasing a hydrophobic property of a surface by treating the mask layer with a silane coupling agent; inducing phase separation of a hydrophilic material and a hydrophobic material of a block copolymer after filling the block copolymer into the groove (or grooves) of the mask layer; selectively removing the hydrophilic material or the hydrophobic material of the block copolymer; and etching the metal layer using the block copolymer as a mask.

Hereinafter, each process of the manufacturing method of the reflective polarizer will be described with reference in FIG. 3 to FIG. 19.

First, a metal layer 500 is formed on a first substrate 110.

The metal layer 500 may function as a reflective polarizer through a patterning process in the next process. The metal layer 500 may be, as shown in FIG. 3, made of dual metal layers 500a and 500b.

The type of metal used in the metal layer 500 is not limited to any type.

In an exemplary embodiment of the present invention, the metal layer 500 may be formed of a first metal layer 500a made of aluminum and a second metal layer 500b made of titanium. However, a single metal layer or dual metal layers of other metals is also applicable.

Next, a mask layer where a groove (or grooves) that exposes the metal layer 500 is patterned is formed on the metal layer 500. The mask layer is divided into an opening area and a non-opening area, and the groove (or the grooves) is patterned in the opening area.

The opening area and the non-opening area are divided on the metal layer, and the process for forming the mask layer where the groove (or the grooves) that exposes the metal layer is formed in the opening area includes: forming a first SiNx layer on the metal layer; forming a mask metal layer on the first SiNx layer; forming a second SiNx layer on the mask metal layer; patterning the second SiNx layer to form grooves that expose a first metal layer with a constant gap; forming a SiOx partition on the second SiNx layer; and etching the metal layer and the first SiNx layer using the SiOx partition as a mask.

FIG. 3 to FIG. 11 illustrate the detailed process of such a second process in detail.

FIG. 3 shows a first SiNx layer 600 formed on the metal layer 500, a mask metal layer 610 formed on the first SiNx layer 600, and a second SiNx layer 620 formed on the mask metal layer 610.

Referring to FIG. 3, the first SiNx layer 600, the mask metal layer 610, and the second SiNx layer 620 are sequentially layered on the metal layer 500 that is formed on the first substrate 110.

In this case, the SiNx layers 600 and 620 are silicon nitride layers, and may be SiN, $Si_3N_4$, and the like.

The SiNx layers are deposited through a PECVD process. In general, hydrogen is included through the deposition process, and accordingly, a material that is substantially deposited becomes SiNx:H and a combination of Si—H or N—H exists in the surface of the SiNx layers.

The SiNx layer is patterned in the subsequent process and thus functions as a mask that form lattices in the metal layer 500. In the present exemplary embodiment, the SiNx layer is formed as dual layers because it is difficult to form a narrow SiNx patterning width through one patterning process.

Now, a method for forming the patterned SiNx layer will be described with reference to FIG. 3 to FIG. 11.

Referring to FIG. 4A, photoresist patterns 630 are formed on the second SiNx layer.

Figure 4B:
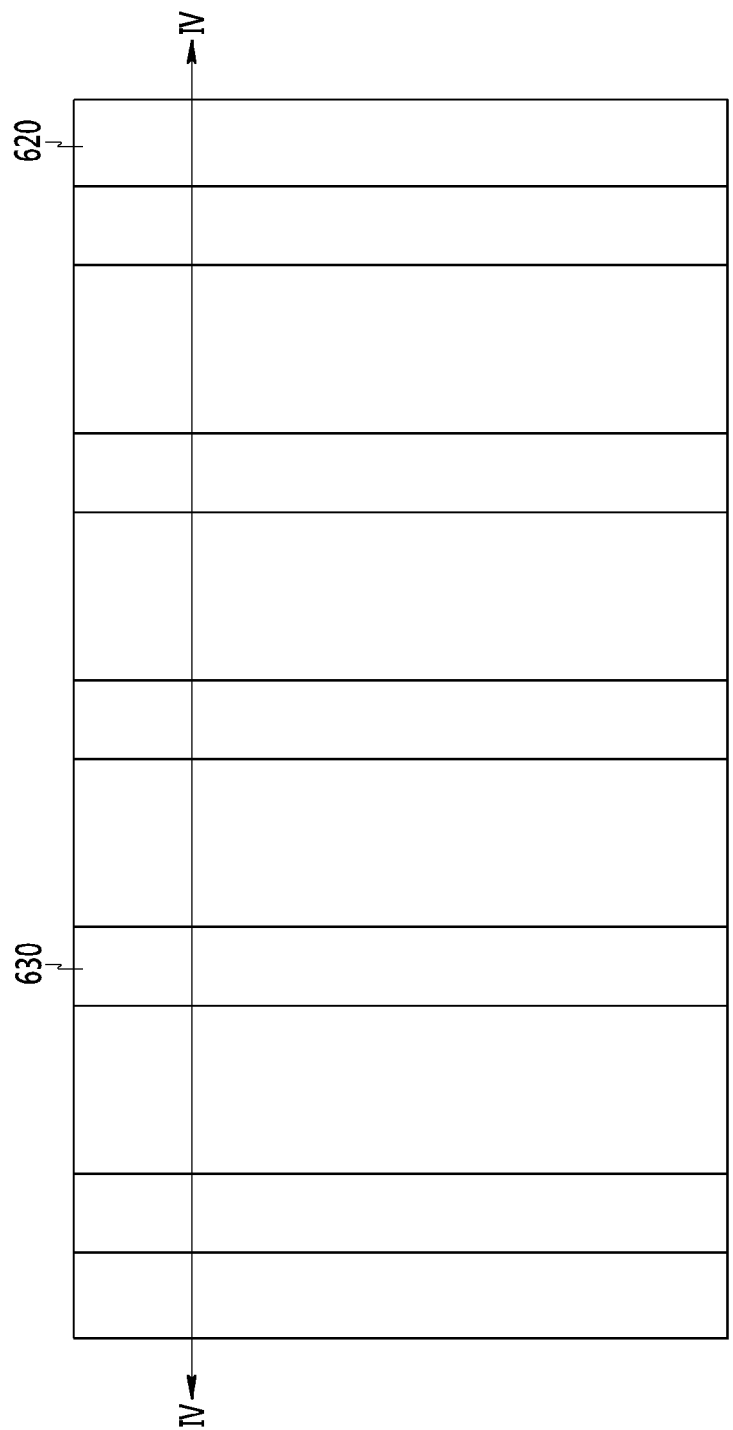

In this case, the photoresist patterns 630 are formed in the shape of a plurality of straight lines arranged in one direction. FIG. 4B is a top plan view of FIG. 4A.

FIG. 4A is a cross-sectional view of FIG. 4B, taken along the line IV-IV. That is, as shown in FIG. 4B, the photoresist patterns 630 are formed in the shape of a plurality of parallel straight lines arranged in one direction.

Figure 6:
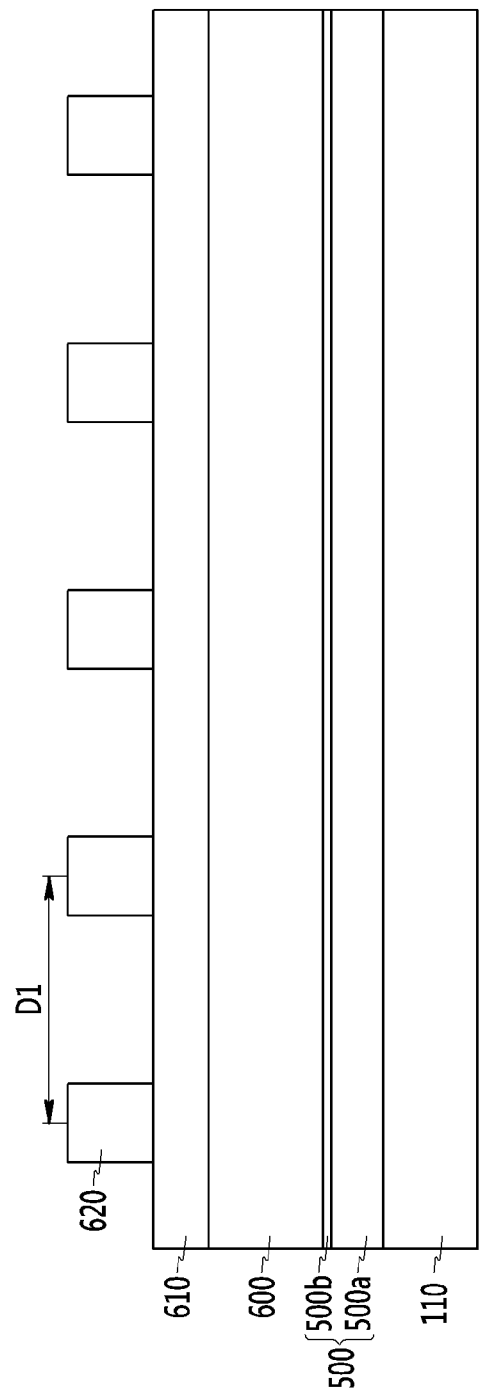

Next, as shown in FIG. 5, the second SiNx layer 620 is patterned using the photoresist patterns 630. Then, as shown in FIG. 6, the photoresist patterns 630 are removed.

In this case, since the mask metal layer 610 exists below, as shown in FIG. 5, only the second SiNx layer 620 is patterned and the first SiNx layer 610 is not affected.

However, a gap D1 between partitions of the patterned second SiNx layer 620 is too wide to become a metal gap of the reflective polarizer.

Figure 7:
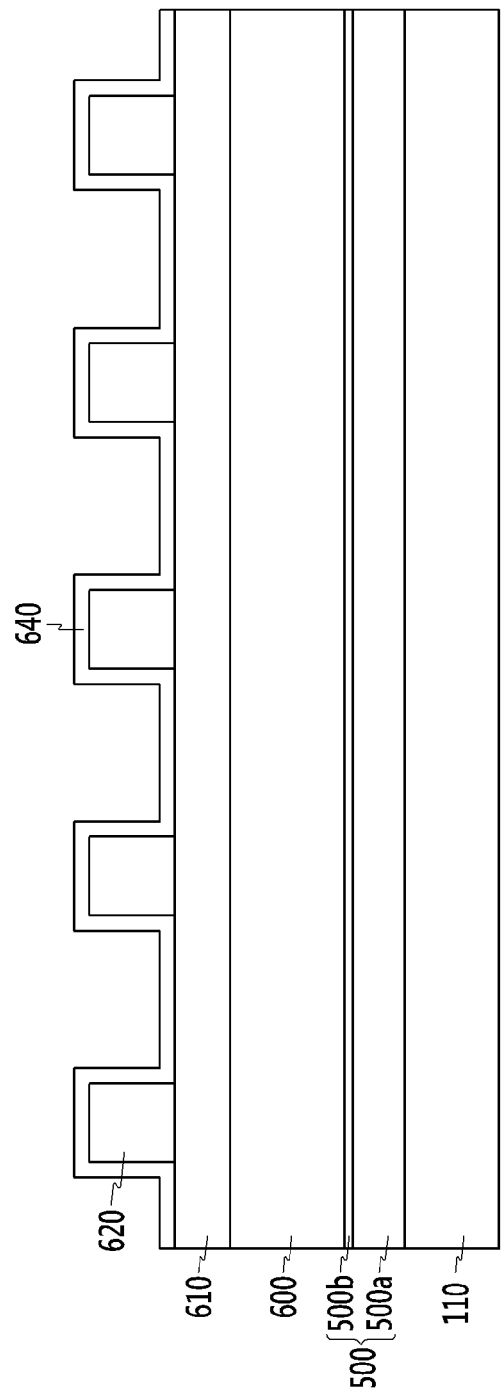

Thus, as shown in FIG. 7, a SiOx layer 640 is formed on the patterned second SiNx layer 620. The SiOx layer 640 surrounds the entire surface of the patterned second SiNx layer 620 as shown in FIG. 7. That is, the side surface and the front surface of the second SiNx layer 620 and the exposed mask metal layer 610 are covered by the SiOx layer 640.

In the exemplary embodiment of the present invention, the SiOx may be $SiO_2$, but it is not restrictive.

Figure 8:
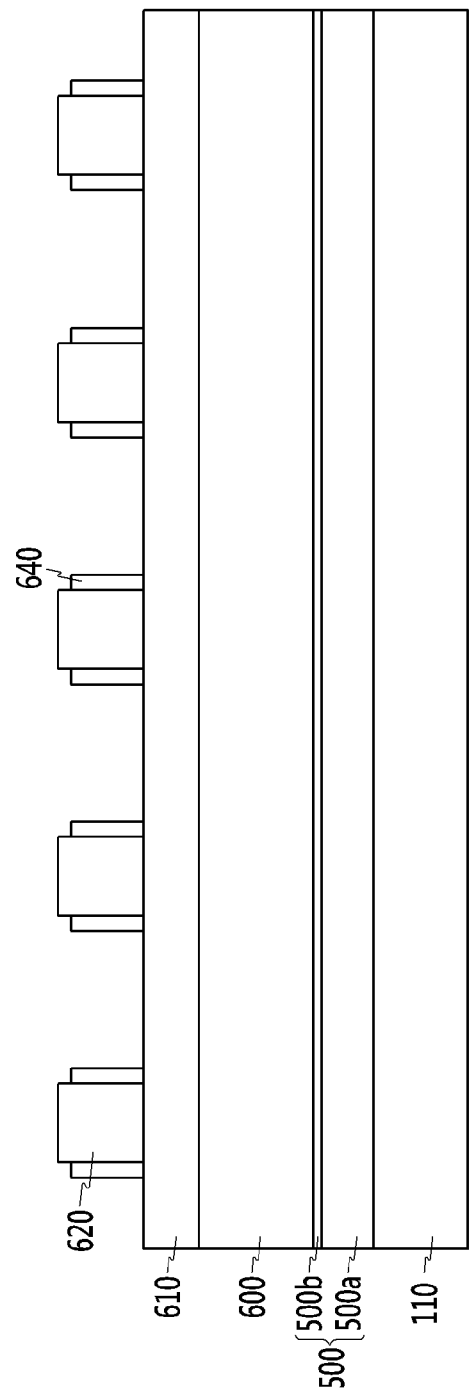

Next, a horizontal component of the SiOx layer 640 is removed by performing etching along a horizontal direction. FIG. 8 shows the SiOx layer 640 where the horizontal component is removed through etching. Referring to FIG. 8, the SiOx layer 640 covered the top surface of the second SiNx layer 620 is removed and thus the second SiNx layer 620 is exposed, and the horizontal SiOx layer 640 formed in the partition of the second SiNx layer 620 and covered the mask metal layer 610 is also removed so that the mask layer 610 is exposed.

Figure 9:
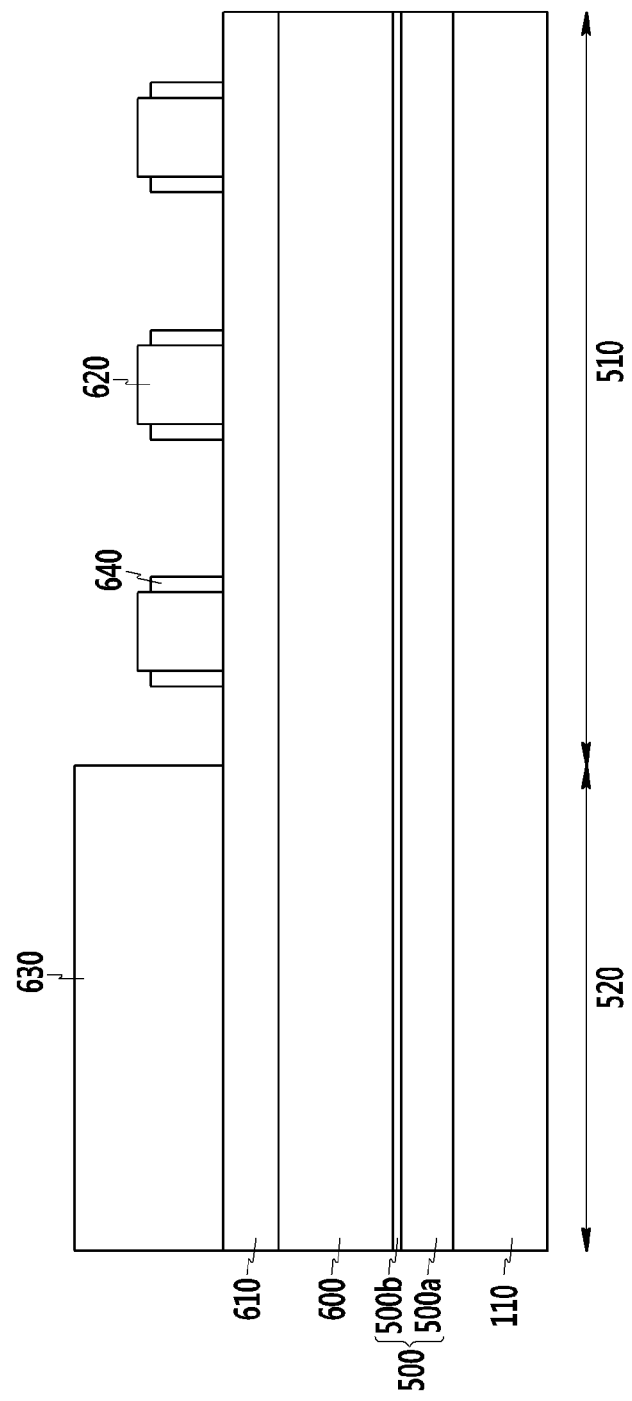

Next, referring to FIG. 9, the photoresist 630 is formed only in a part of the reflective polarizer 500 to divide the opening area 510 and the non-opening area 520. As shown in FIG. 9, the photoresist 630 is formed in a part of the reflective polarizer 500 to cover the entire surface of the second SiNx layer 620. An area where the photoresist 630 is formed becomes the non-opening are 520 where a black matrix and the like are formed, and an area where the photoresist 630 is not formed becomes the opening area 510 where a pixel electrode and the like are formed and thus an image is displayed.

Figure 10:
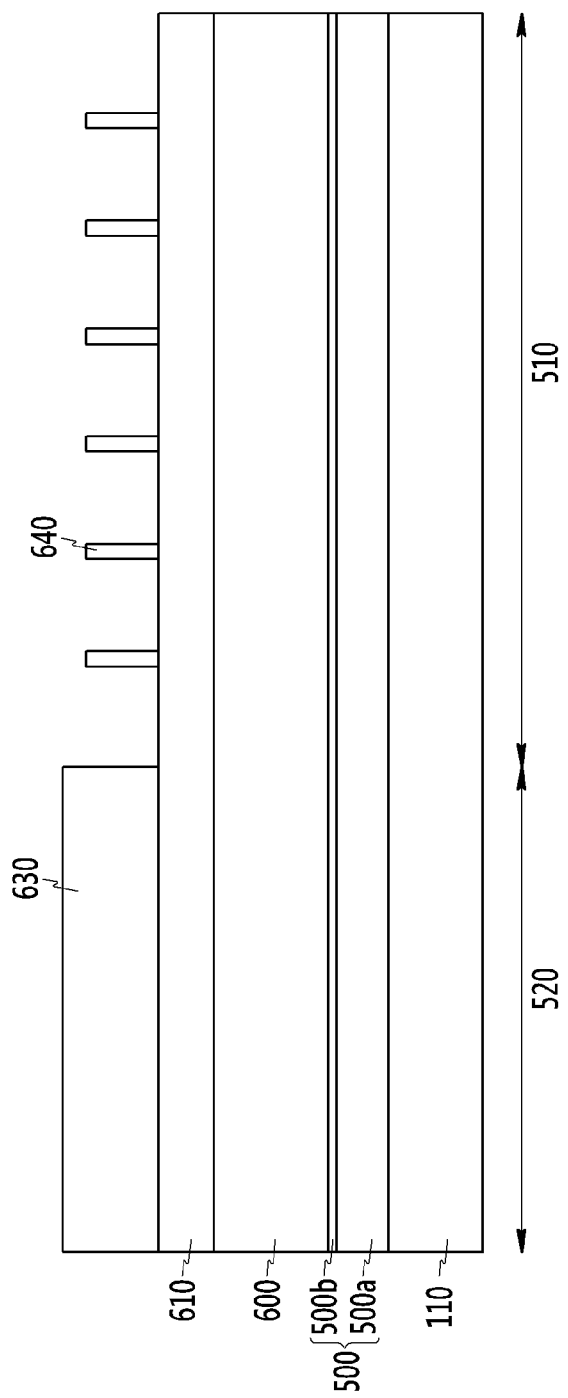

Next, referring to FIG. 10, the patterned second SiNx layers 620 in the area where the photoresist 630 is not formed are removed. The patterned second SiNx layers 620 of the non-opening area 520 are covered by the photoresist 630, and thus they are not affected even through the patterned second SiNx layers 620 in the opening area 510 are removed. Through such removal, only a vertical component of the SiOx layer 640 remains on the mask metal layer 610 as shown in FIG. 10. That is, a plurality of partitions, each made of the SiOx layer 640, are formed on the mask metal layer 610.

Figure 11:
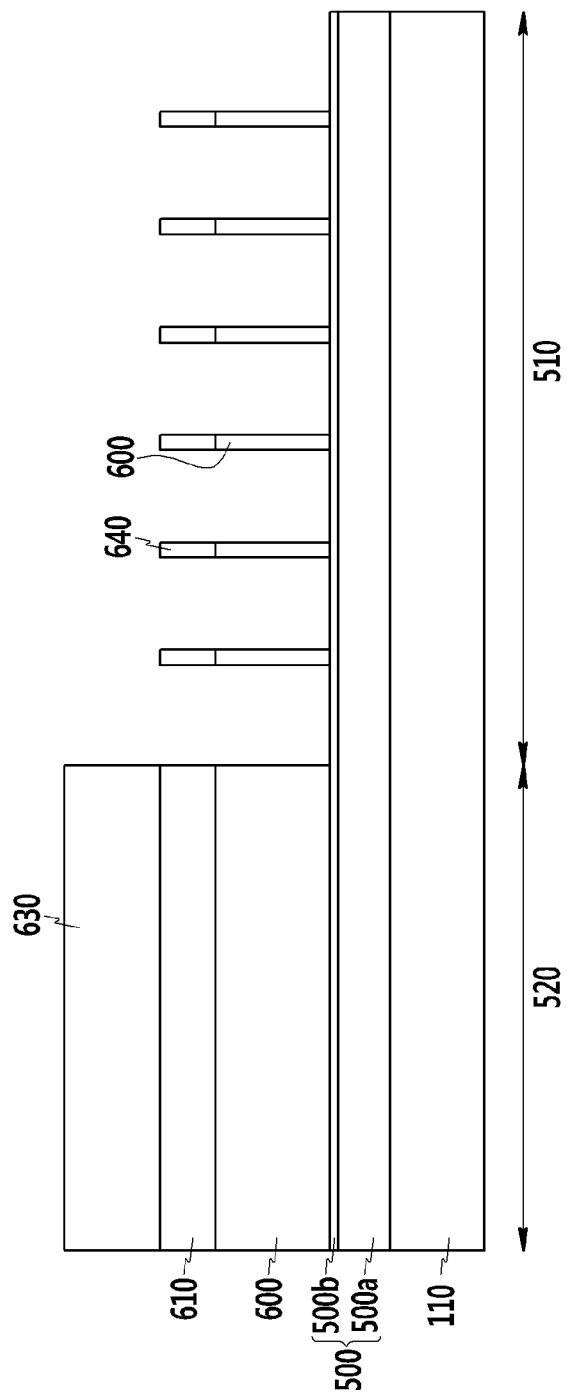

Next, referring to FIG. 11, the mask metal layer 610 and the first SiNx layer 600 are etched by using the SiOx partitions 640 as a mask as shown in FIG. 11. In this case, the non-opening are 520 where the photoresist pattern 630 is formed is not etched.

Thus, as shown in FIG. 11, patterns formed in an area of the first SiNx layer 600, corresponding to the opening area 520, have the same gap as that of the partitions of the SiOx layer 640, and no pattern is formed in an area corresponding to the non-opening area 520.

In this case, patterns formed in the opening area 510 of the first SiNx layer 600 expose the metal layer 500.

That is, as described with reference to FIG. 3 to FIG. 11, the opening area 510 and the non-opening area 520 are divided through the above-stated process, and the patterned first SiNx layer where the grooves that expose the metal layer 500 are patterned is formed in the opening area 510.

Such a SiNx layer is referred to as a mask layer hereinafter.

In the present exemplary embodiment, the mask layer is described as a SiNx layer, but the mask layer may include other materials.

Figure 12:
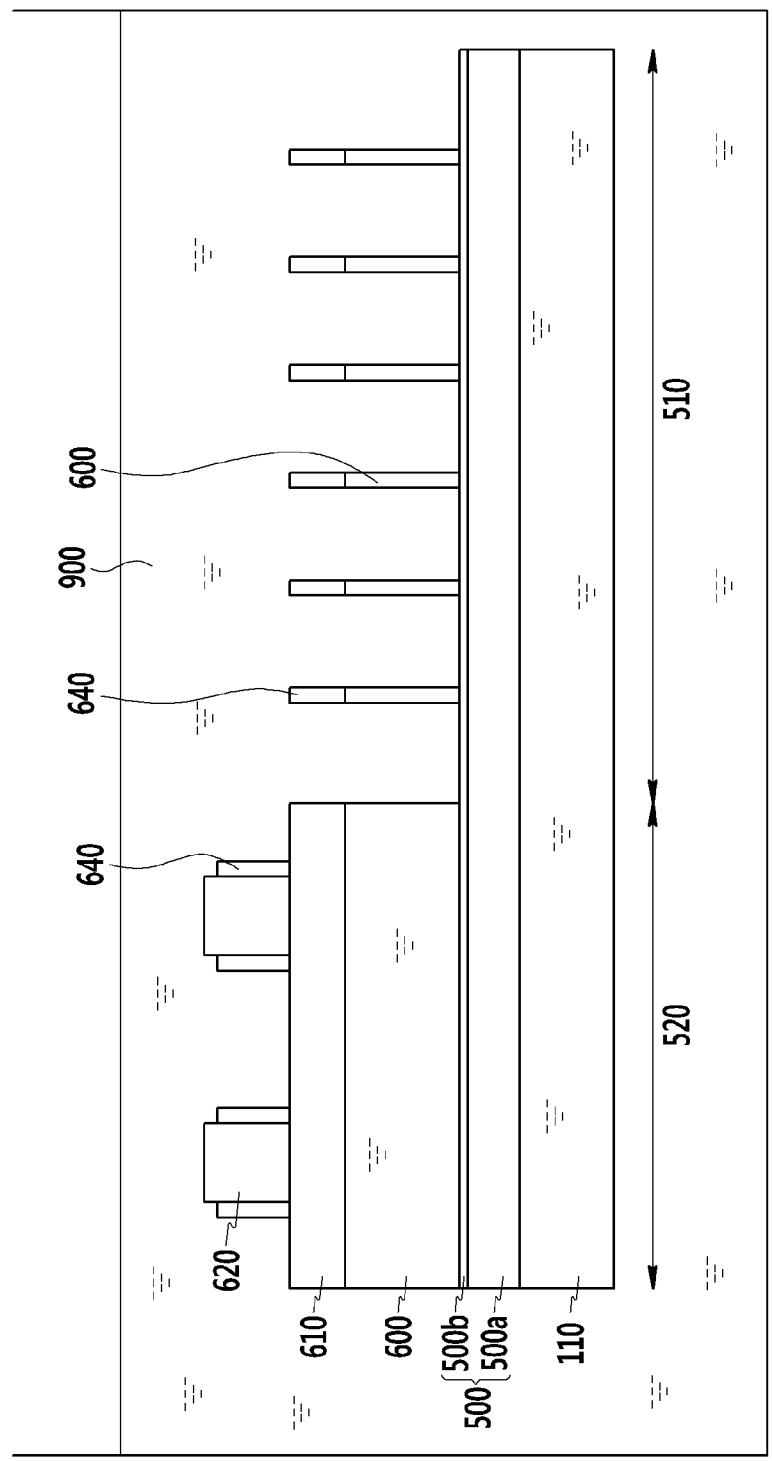

In the next process, hydrophobicity of a surface is increased by treating the mask layer using a silane coupling agent. The surface modification of the SiNx layer may be simply performed by immersing the reflective polarizer that is being manufactured in a solution 900 including the silane coupling agent as shown in FIG. 12. In this case, a solvent including the silane coupling agent is not restrictive, and may be a general solvent such as ethanol, methanol, toluene, benzene, hexanol, and the like.

The reflective polarizer is immersed in the organic solvent for a given time period, and the time period is appropriately controllable according to concentration of the silane coupling agent. In the exemplary embodiment of the present invention, immersion time period in the solvent may be 10 to 60 minutes.

In the present exemplary embodiment, the method of immersing the reflective polarizer into the solvent is exemplary described as a method for surface modification of the SiNx layer using the silane coupling agent, but any method known to a person skilled in the art is applicable as the modification method.

The silane coupling agent used in the present invention has an X-L-R structure, wherein X is a reaction functional group that may be chemically combined with Si—H or N—H in the SiNx surface, R is a hydrophobic functional group, and L is a linker that links the reaction functional group and the hydrophobic functional group. L may be carbon.

That is, the silane coupling agent is a compound where the reaction functional group X that may react with hydrogen and the hydrophobic functional group R are linked to each other.

In this case, the reaction functional group may be a methoxy or ethoxy material, or a halogen-based material. However, any material that can react with hydrogen at the surface of the SiNx layer is usable as the reaction functional group X.

In addition, R in the silane coupling agent is a hydrophobic functional group having high hydrophobicity. In this case, R may be a fluorine-containing compound or a compound including a benzene ring. Alternatively, R may be CF3-CF2n-, PDD (2,2-bis(trifluoromethyl)-4,5-difluoro-1,3-dioxole), or CBr3-.

That is, any functional group having high hydrophobicity is used, and a material having a contact angle of 80 degrees or more is preferred.

Table 1 shows hydrophobic functional groups, contact angles of the respective functional groups, and detailed examples of functional groups according to the exemplary embodiment of the present invention.

TABLE 1

| Hydrophobic functional group (R) | Contact angle (°) | Example of functional group |
|---|---|---|
| CF3— | ~120 | 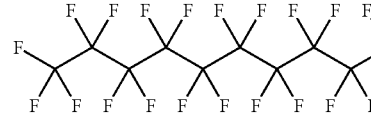 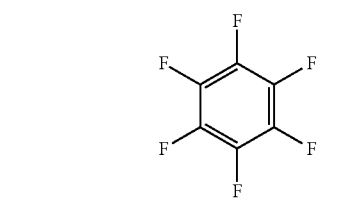 [SMILES: Fc1c(F)c(F)c(F)c(F)c1F] 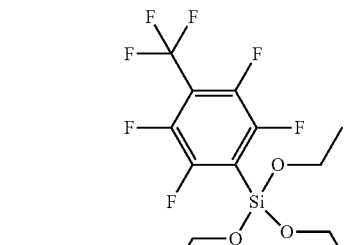 |
| PDD | ~105 | 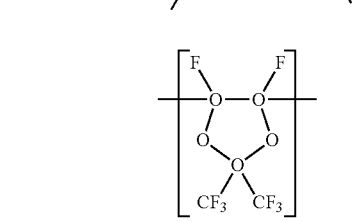 |

TABLE 1-continued

| Hydrophobic functional group (R) | Contact angle (°) | Example of functional group |
|---|---|---|
| CBr3— | 83 | 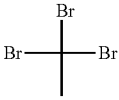 |

Thus, the silane coupling agent used in the surface modification of the SiNx layer includes both of the reaction functional group X that reacts with hydrogen at the surface of the SiNx layer and the hydrophobic functional group R.

When the SiNx layer and the silane coupling agent are reacted with each other using the method of immersing the reflective polarizer in the solution 900 including the silane coupling agent as in the present exemplary embodiment, the reaction functional group X of the silane coupling agent reacts with hydrogen in the surface of the SiNx layer and the silane coupling agent is combined with Si in the SiNx.

Figure 13:
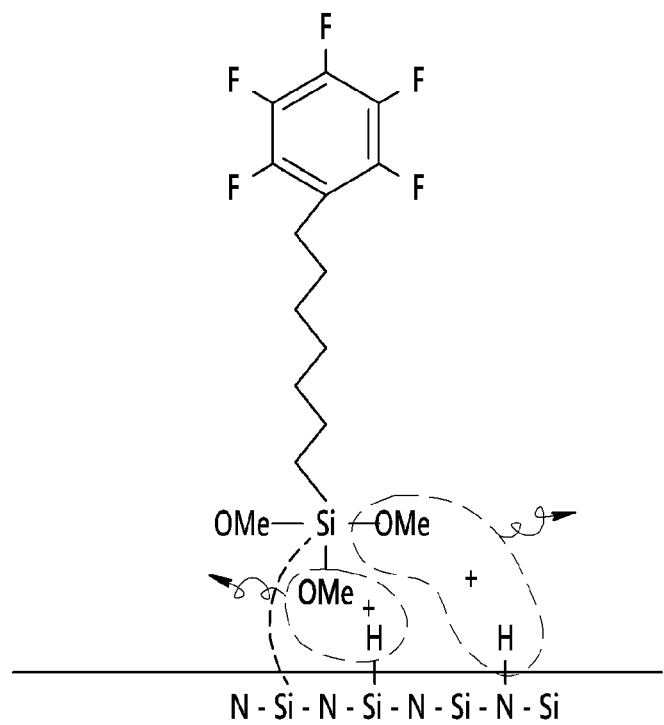

FIG. 13 is a diagram illustrating such a reaction mechanism.

Referring to FIG. 13, the plasma enhanced chemical vapor deposition (PECVD) method is generally used when forming the SiNx layer, and in this case, hydrogen is not completely removed so that hydrogen dangling bonds exist in the surface of the SiNx layer.

The hydrogen dangling bonds are hydrophobic, and thus deteriorate the hydrophobic properties of the partitions of the SiNx layer. Although it will be described in the subsequent process, it is preferable that the partitions of the SiNx layer have high hydrophobicity for manufacturing a reflective polarizer having a narrow metal gap.

However, since the hydrogen dangling bonds exist in the surface of the SiNx layer, high hydrophobicity of the partitions of the SiNx layer cannot be assured.

When the silane coupling agent and the SiNx layer are reacted according to the exemplary embodiment of the present invention, the hydrogen dangling agents in the surface of the SiNx layer are removed by being reacted with the reaction functional group (OMe— in FIG. 13) of the silane coupling agent as shown in FIG. 13. Thus, Si in the silane coupling agent and Si in the SiNx layer are reacted with each other and thus combined to each other. Since the hydrophobicity (CF3- in FIG. 13) is linked at the other end of the silane coupling agent, the surface of the SiNx layer has high hydrophobicity.

Thus, the surface of the SiNx layer can be modified to have high hydrophobicity by treating the SiNx layer with the silane coupling agent.

Next, the grooves of the mask layer are filled with a block copolymer, and then phase separation of a hydrophilic component and a hydrophobic component of the block copolymer is induced.

The block copolymer is formed of a plurality of composition units (blocks), and refers to a copolymer of which an adjacent block has a different characteristic in chemical structure and stereoscopic alignment with a block. The copolymer in the present exemplary embodiment is formed of a combination of a hydrophilic block and a hydrophobic block.

Figure 14:
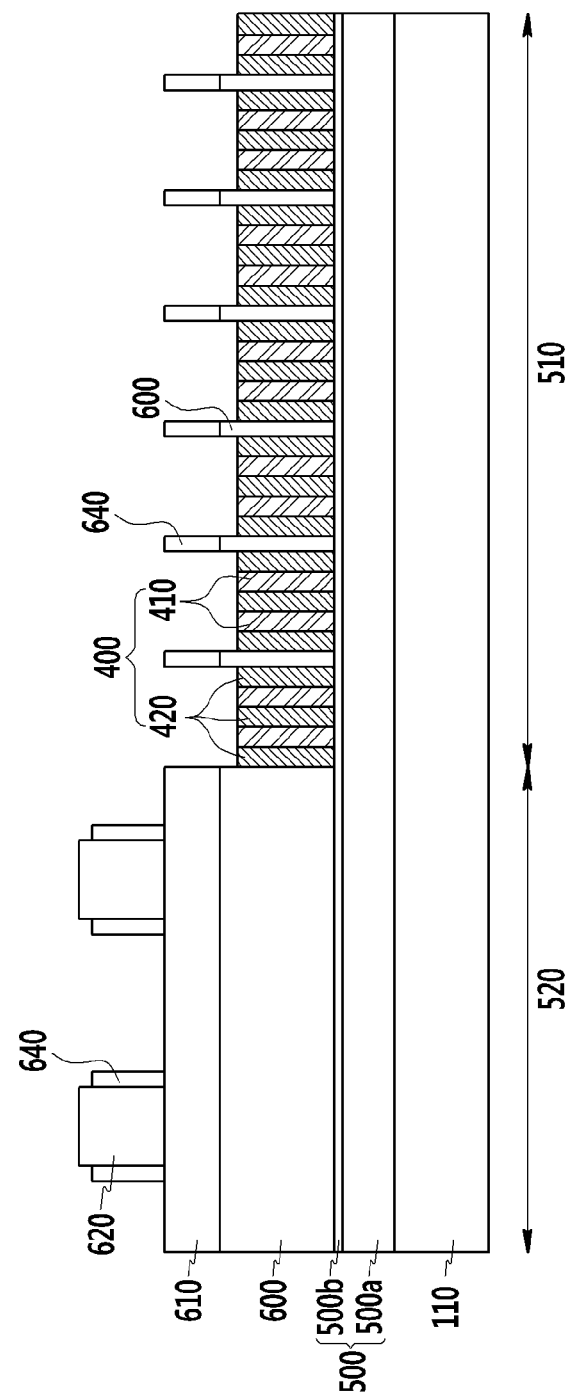

Referring to FIG. 14, block copolymers 400 are formed in the partitions of the first SiNx layer patterned to have a plurality of partitions. Each block copolymer 400 includes a hydrophilic block 410 and a hydrophobic block 420.

The block copolymers 400 are formed in the partitions of the first SiNx layer 600, and phase separation of the hydrophilic block 410 and the hydrophobic block 420 is induced. In this case, the phase separation may be performed through a general annealing method.

Since uniform phase separation of the hydrophilic block 410 and the hydrophobic block 420 determines a gap alignment in the metal layer 500, it is preferable that the phase separation is uniformly and densely performed.

The phase separation of the block copolymer 400 needs to be performed in the present step because the partitions of the SiNx layer have a hydrophobic property and the exposed metal layer 500 has a hydrophilic property. Thus, for more effective phase separation, the partition of the SiNx layer 600 needs to be more hydrophobic and the exposed metal layer 500 needs to be more hydrophilic. That is, it is preferable that the SiNx partition 600 at the side surface and the exposed metal layer 500 in the front side have a large contact angle difference.

A method for manufacturing a reflective polarizer according to a comparative example of the present invention does not include a process for increasing hydrophobicity of the surface by treating a mask layer with a silane coupling agent.

In this case, a contact angle of the SiNx partition 600 is about 40 degrees and a contact angle of the metal layer 500$b$ made of Ti is about 20 degrees, and thus a contact angle difference is small.

This is because a hydrogen dangling bond remains in the surface through the SiNx deposition process, and hydrogen is hydrophilic so that a hydrogen property of the SiNx partition is decreased.

Thus, when the reflective polarizer is manufactured without performing a process for treating the silane coupling agent, a sufficient contact angle difference for phase separation of the block copolymer cannot be assured.

Figure 15:
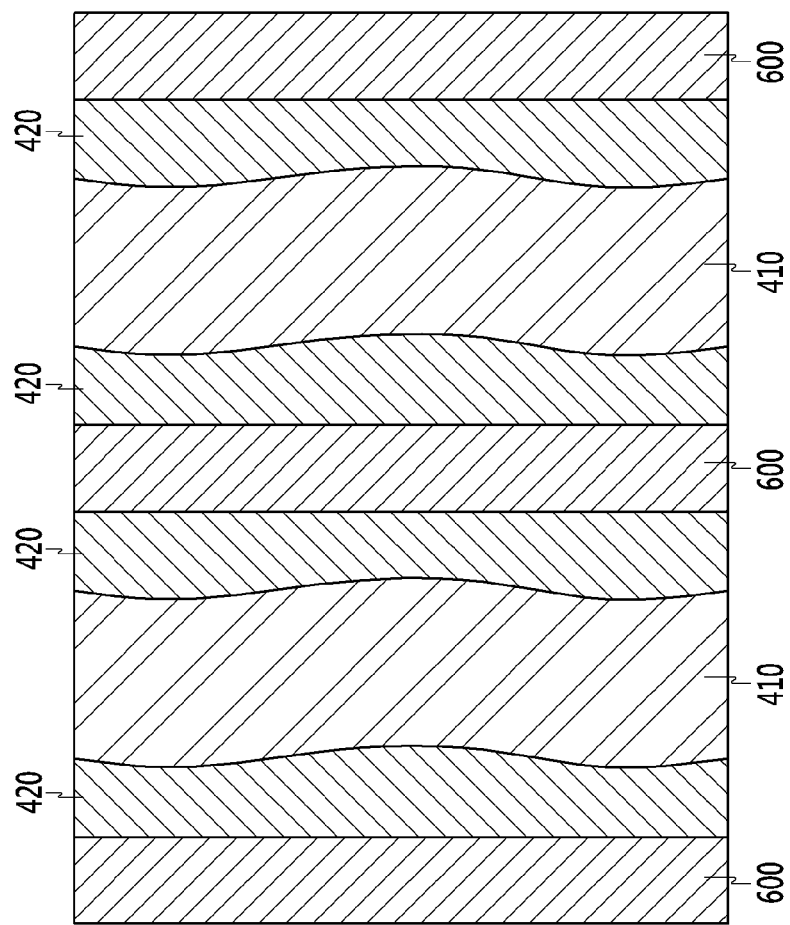

FIG. 15 is a schematic view of a phase separation state after phase separation of the block copolymer in the manufacturing method of the reflective polarizer in the comparative example of the present invention. FIG. 15 is a top view of a cross-section of FIG. 14.

Referring to FIG. 15, in the method for manufacturing the reflective polarizer according to the comparative example of the present invention, the SiNx partition is not treated using the silane coupling agent and the like, and accordingly, the SiNx partition does not have a contact angle. Therefore, phase separation of the hydrophilic block 410 and the hydrophobic block 420 of the block copolymer cannot be uniformly performed, and as shown in FIG. 15, the hydrophilic block 410 and the hydrophobic block 420 cannot be uniformly arranged.

However, in the manufacturing method of the reflective polarizer according to the exemplary embodiment of the present invention, the SiNx partition is treated using the silane coupling agent to modify the surface of the SiNx layer. Thus, the hydrogen dangling bond is removed through a mechanism shown in FIG. 13, and thus a hydrophobic reaction functional group R exists in the surface, thereby reinforcing hydrophobicity.

Therefore, the SiNx partition 600 and the surface metal layer 500 have a large contact angle difference and phase separation of the block copolymer is easily performed.

Figure 16:
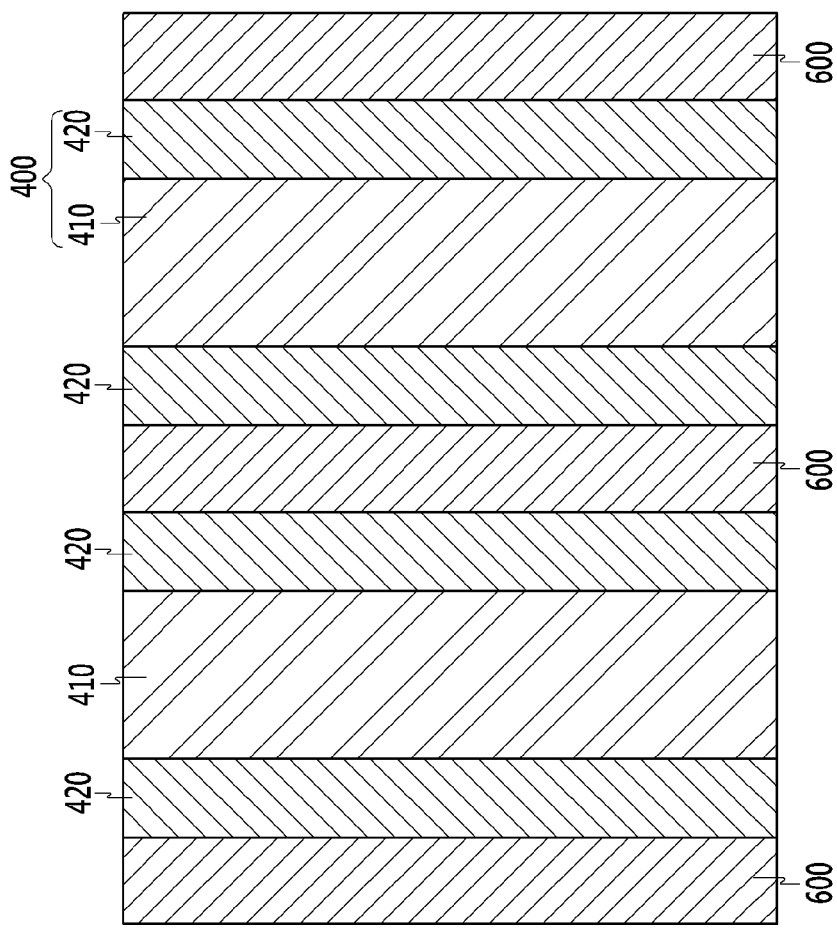

FIG. 16 illustrates a block copolymer where phase separation has occurred in the manufacturing process of the reflective polarizer according to the exemplary embodiment of the present invention. FIG. 16 is a top view of a cross-section of FIG. 14, which is the same part in the comparative example shown in FIG. 15.

Referring to FIG. 16, a contact angle difference between the SiNx partition 600 and the metal layer 500 is increased because the SiNx partition 600 is treated using the silane coupling agent, and thus phase separation of the hydrophilic block 410 and the hydrophobic block 420 of the block copolymer uniformly occurs.

Next, a hydrophilic component or a hydrophobic component of the block copolymer is selectively removed.

Figure 17:
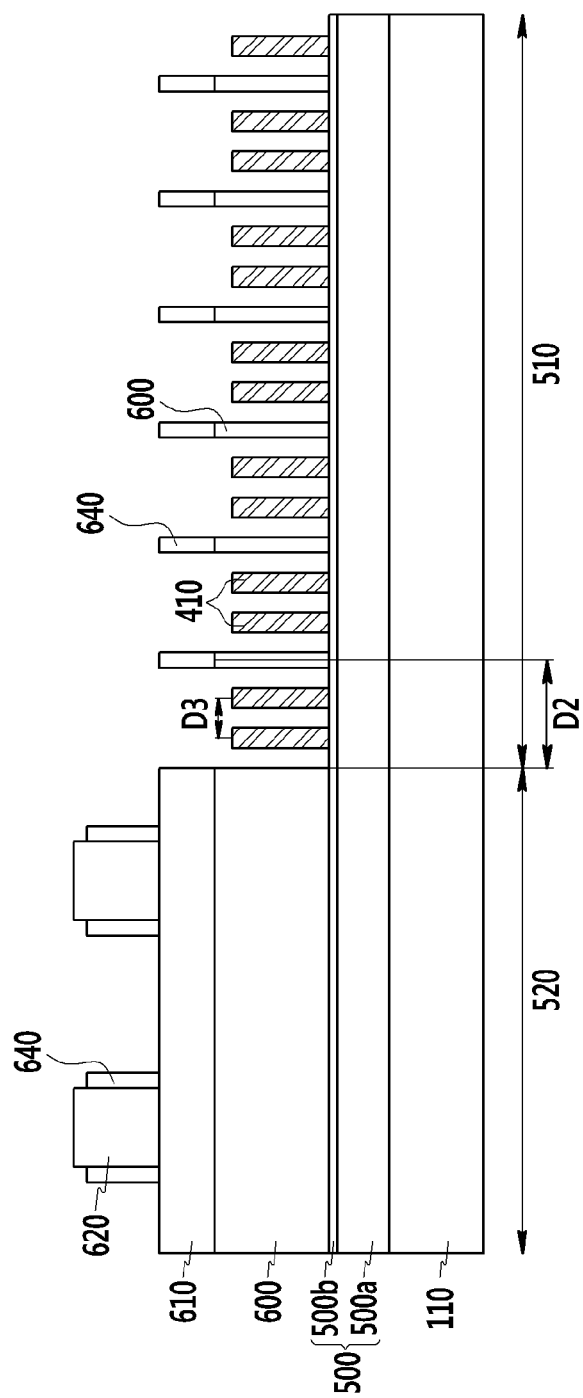

When the phase separation of the hydrophilic component and the hydrophobic component is induced after filling the block copolymer in the mask layer, the hydrophilic block 410 and the hydrophobic block 420 are constantly separated and arranged along the SiNx partition 600. Thus, only the hydrophilic component of the block copolymer 400 is removed, so uniform partitions having a constant gap therebetween are formed. FIG. 17 illustrates a case of selective removal of the hydrophobic component, and FIG. 18 illustrates a case of selective removal of the hydrophilic component.

Figure 18:
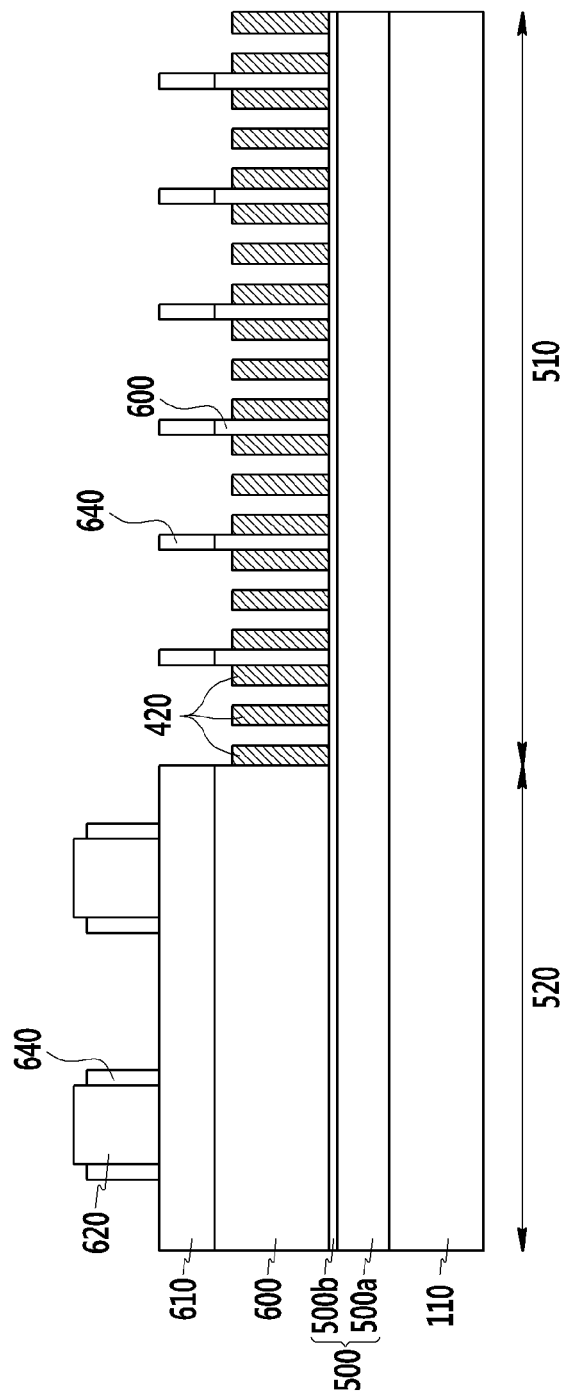

As shown in FIG. 17 and FIG. 18, when the hydrophobic component or the hydrophilic component is selectively removed, a partition of the hydrophilic component 410 or hydrophobic component 420, having a width D3 that is smaller than a width D2 which is a width between the SiNx partitions, is formed.

Next, the metal layer 500 is etched using the block copolymer 400 as a mask.

As previously described, the block copolymer 400 where only the hydrophilic component or the hydrophobic component remains functions as a mask. In this case, there is a merit of acquiring a mask having the width D3 that is narrower than the width D2 of the SiNx partition. The width D3 may be 100 nm or less.

That is, when the metal layer 500 is etched using the SiNx partition 600 as a mask, patterns of a unit of tens of nanometers cannot be acquired. However, phase separation of the block copolymer 400 occurs with a unit of tens of nanometers, and only the hydrophilic component or the hydrophobic component is selectively removed so that a mask where lattices of a unit of tens of nanometers can be acquired.

Figure 19:
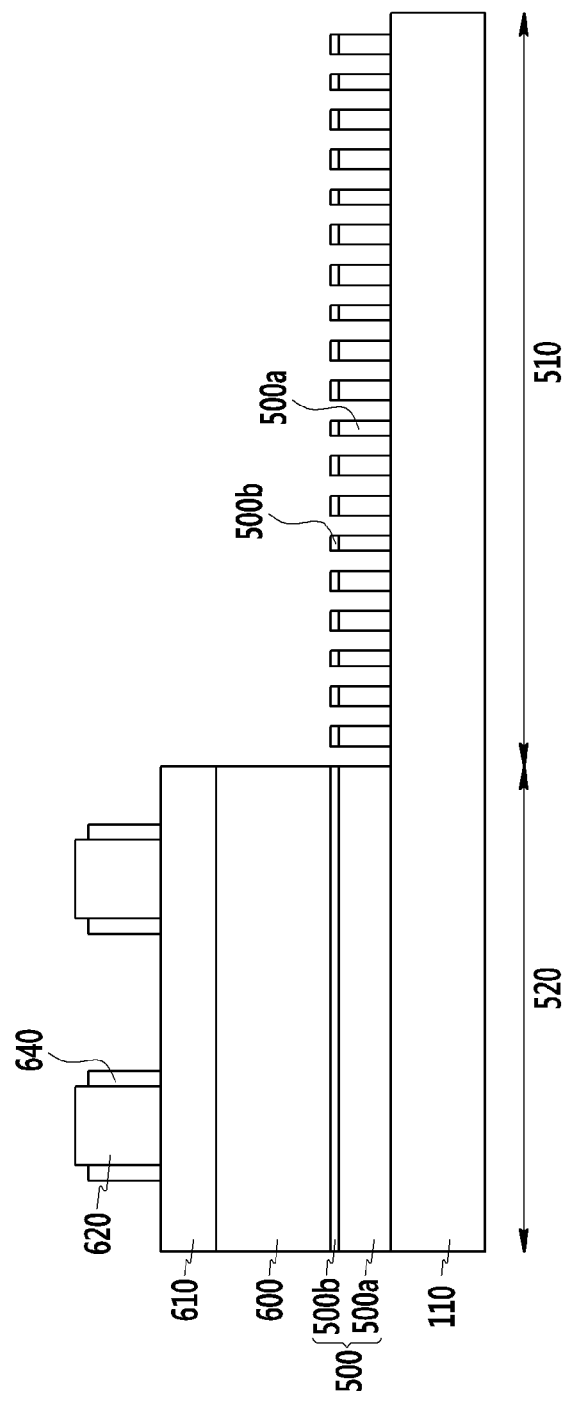

Thus, as shown in FIG. 19, patterns of micro-metal lattices are formed.

In this process, the SiNx partitions are not formed above the non-opening area 520 of the metal layer as shown in FIG. 19, so the metal layer 500 is not patterned.

As shown in FIG. 19, the metal layer 500 is divided into the non-opening area 520 where the patterns are not formed and the opening area 510 where the patterns are formed, a pixel electrode and the like is formed later in the opening area 510, and a thin film transistor and the like is provided on the non-opening area 520.

Next, although not illustrated, a structure such as the first SiNx layer 600 layered on the metal layer 500 is removed such that the reflective polarizer is completed.

As described above, in the manufacturing method of the reflective polarizer according to the exemplary embodiment of the present invention, a partition pattern having a first gap is formed as a SiNx layer, and then a partition pattern having a second gap that is narrower than the first gap is formed using phase separation of the block copolymer between the partitions of the SiNx layer. The metal layer that becomes a reflective polarizer is etched through such a partition pattern so that a reflective polarizer having narrow gap and accordingly having an excellent polarization characteristic can be manufactured.

In addition, the SiNx layer is treated using the silane coupling agent before forming the block copolymer to thereby increase hydrophobicity so that phase separation of the block copolymer can more easily occur, and a reflective polarizer having more constant and uniform patterns can be manufactured according to the exemplary embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A manufacturing method of a reflective polarizer, comprising:
    forming a metal layer on a first substrate;
    forming a mask layer divided into an opening area and a non-opening area on the metal layer, and having grooves patterned in the opening area, the groove exposing the metal layer;
    increasing hydrophobicity of a surface by treating the mask layer using a silane coupling agent;
    inducing phase separation of a hydrophilic component and a hydrophobic component of a block copolymer after filling the grooves of the mask layer with the block copolymer;
    selectively removing the hydrophilic component or the hydrophobic component of the block copolymer; and
    etching the metal layer using the block copolymer as a mask.

2. The manufacturing method of the reflective polarizer of claim 1, wherein the metal layer is formed of a single layer made of aluminum or dual layers of aluminum and titanium.

3. The manufacturing method of the reflective polarizer of claim 1, wherein the mask layer comprises a SiNx.

4. The manufacturing method of the reflective polarizer of claim 3, wherein the forming the mask layer comprises:
    forming a first SiNx layer on the metal layer;
    forming a mask metal layer on the first SiNx layer;
    forming a second SiNx layer on the mask metal layer;
    patterning the second SiNx layer to make grooves exposing the mask metal layer with constant gaps therebetween;
    forming SiOx partitions on the second SiNx layer;
    removing the second SiNx layer; and
    etching the metal layer and the first SiNx layer using the SiOx partitions as a mask.

5. The manufacturing method of the reflective polarizer of claim 1, wherein the increasing of the hydrophobicity of the surface by treating the mask layer using the silane coupling agent is performed by immersing the reflective polarizer in a solvent including the silane coupling agent after the forming of the mask layer.

6. The manufacturing method of the reflective polarizer of claim 1, wherein the silane coupling agent has an X-L-R structure,
    X is a reaction functional group that is chemically combined with Si—H or N—H in the SiNx surface, R is a hydrophobic functional group, and L is a linker that links the reaction functional group and the hydrophobic functional group.

7. The manufacturing method of the reflective polarizer of claim 6, wherein the X is a methoxy or ethoxy material, or a halogen-based material.

8. The manufacturing method of the reflective polarizer of claim 6, wherein the R is a fluorine-containing compound or a compound including a benzene ring.

9. The manufacturing method of the reflective polarizer of claim 6, wherein the R is $CF_3-CF_{2n}-$, PDD (2,2-bis(trifluoromethyl)-4,5-difluoro-1,3-dioxole), or $CBr_3-$.

10. The manufacturing method of the reflective polarizer of claim 6, wherein the L is carbon of C1 or higher.

11. The manufacturing method of the reflective polarizer of claim 1, wherein after the increasing of the hydrophobicity of the surface by treating the mask layer using the silane coupling agent, a contact angle of partitions of the mask layer is greater than 50 degrees.

12. The manufacturing method of the reflective polarizer of claim 1, wherein after the increasing of the hydrophobicity of the surface by treating the mask layer using the silane coupling agent, a contact angle of partitions of the mask layer is greater by 30 degrees or more than a contact angle of the metal layer exposed between the partitions.

13. The manufacturing method of the reflective polarizer of claim 3, wherein after the increasing of the hydrophobicity of the surface by treating the mask layer using the silane coupling agent, hydrogen in the SiNx surface is removed by being reacted with X in the silane coupling agent.

14. The manufacturing method of the reflective polarizer of claim 1, wherein the block copolymer comprises a hydrophilic block and a hydrophobic block.

15. The manufacturing method of the reflective polarizer of claim 1, wherein after filling the block copolymer in the grooves of the mask layer, phase separation of the block copolymer in the inducing the phase separation of a hydrophilic component and a hydrophobic component of the block copolymer is performed using annealing.

16. The manufacturing method of the reflective polarizer of claim 3, wherein in the inducing the phase separation of the hydrophilic component and the hydrophobic component of the block copolymer after filling the block copolymer in the grooves of the mask layer, the hydrophobic component is formed adjacent to the partition of the SiNx groove and the hydrophilic component is arranged in parallel with the hydrophobic component after the phase separation of the block copolymer.

17. The manufacturing method of the reflective polarizer of claim 1, wherein after the selective removing of only the hydrophobic component or the hydrophilic component of the block copolymer, a gap between remaining the block copolymer is less than 100 nm.

18. The manufacturing method of the reflective polarizer of claim 1, wherein a line width of an opening of the completed reflective polarizer is less than 100 nm.

\* \* \* \* \*